US012153276B2

(12) United States Patent
Erichson (10) Patent No.: US 12,153,276 B2
(45) Date of Patent: Nov. 26, 2024

(54) OPTICAL ASSEMBLY, IN PARTICULAR FOR POLARIZATION OF A LASER BEAM, AND EUV RADIATION GENERATING DEVICE THEREWITH

(71) Applicant: TRUMPF Lasersystems for Semiconductor Manufacturing GmbH, Ditzingen (DE)

(72) Inventor: Oliver Erichson, Ditzingen (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 336 days.

(21) Appl. No.: 17/197,082

(22) PCT Filed: Sep. 12, 2018

(86) PCT No.: PCT/EP2018/074547
§ 371 (c)(1),
(2) Date: Mar. 10, 2021

(87) PCT Pub. No.: WO2020/052744
PCT Pub. Date: Mar. 19, 2020

(65) Prior Publication Data
US 2023/0118278 A1 Apr. 20, 2023

(51) Int. Cl.
*G02B 7/00* (2021.01)
*G02B 5/20* (2006.01)
(Continued)

(52) U.S. Cl.
CPC ............. *G02B 7/008* (2013.01); *G02B 5/201* (2013.01); *G02B 5/30* (2013.01); *G02B 7/003* (2013.01);
(Continued)

(58) Field of Classification Search
CPC .......... G02B 7/008; G02B 5/201; G02B 5/30; G02B 7/003; G02B 7/023; G02B 27/0955;
(Continued)

(56) References Cited

U.S. PATENT DOCUMENTS 4,119,929 A * 10/1978 Shackleford ............... H01S 3/04
372/12
4,573,794 A * 3/1986 Covey .................... G02B 7/004
356/451
(Continued)

FOREIGN PATENT DOCUMENTS

| DE | 102014105064 A1 | 5/2015 |
|---|---|---|
| EP | 0413639 A1 | 2/1991 |

(Continued)

OTHER PUBLICATIONS

Examiner provided machine translation of Krauss et al., WO2017063686 A1 (Year: 2017).*

*Primary Examiner* — Balram T Parbadia
(74) *Attorney, Agent, or Firm* — LEYDIG, VOIT & MAYER, LTD.

(57) ABSTRACT

An optical assembly is for polarizing a laser beam. The optical assembly has a plurality of plate-shaped optical elements having a beam entry surface and a beam exit surface, and a holder configured to joint fix the plate-shaped optical elements. At least three spacers are arranged between each two adjacent ones of the plate-shaped optical elements. Each of the spacers is configured to provide punctiform contact with the respective beam exit surface of a first plate-shaped optical element, of the plate-shaped optical elements, and to provide punctiform contact with the respective beam entry surface of a second adjacent plate-shaped optical element, of the plate-shaped optical elements.

15 Claims, 3 Drawing Sheets

(51) Int. Cl.
  *G02B 5/30* (2006.01)
  *G02B 7/02* (2021.01)
  *G02B 27/09* (2006.01)

(52) U.S. Cl.
  CPC ......... *G02B 7/023* (2013.01); *G02B 27/0955* (2013.01)

(58) Field of Classification Search
  CPC .... G02B 27/286; G02B 5/3066; G02B 7/006; G02B 7/00; G02B 27/28; H01S 3/005; H01S 3/22
  See application file for complete search history.

(56) References Cited

U.S. PATENT DOCUMENTS

| | | | | |
|---|---|---|---|---|
| 5,061,046 A * | 10/1991 | Lee | ........................ | C09K 19/38 349/193 |
| 5,119,240 A | 6/1992 | Marion et al. | | |
| 5,557,692 A * | 9/1996 | Pan | ........................ | G02F 1/093 385/11 |
| 5,784,203 A * | 7/1998 | Beckmann | ......... | G02B 27/0955 359/629 |
| 5,812,707 A * | 9/1998 | Yamane | ............... | G02B 6/4213 385/11 |
| 5,986,794 A * | 11/1999 | Krause | ................. | G02B 27/095 359/896 |
| 6,600,605 B1 * | 7/2003 | Anikitchev | ........ | G02B 19/0052 359/639 |
| 2007/0267647 A1 | 11/2007 | Lee et al. | | |
| 2008/0002751 A1 | 1/2008 | Hua et al. | | |
| 2011/0261448 A1 * | 10/2011 | Kasumi | ................... | G02B 7/023 359/399 |
| 2014/0111849 A1 * | 4/2014 | Xuegong | .......... | G02F 1/133788 359/483.01 |
| 2014/0177058 A1 * | 6/2014 | Koike | .................... | G02B 5/284 359/578 |
| 2018/0231790 A1 | 8/2018 | Hartung et al. | | |
| 2020/0154554 A1 | 5/2020 | Ergin | | |
| 2021/0003758 A1 * | 1/2021 | Jeong | .................. | C09K 19/586 |

FOREIGN PATENT DOCUMENTS

| | | |
|---|---|---|
| EP | 2369391 A1 | 9/2011 |
| GB | 2136145 A | 9/1984 |
| WO | WO 2017063686 A1 | 4/2017 |
| WO | WO 2019011419 A1 | 1/2019 |

\* cited by examiner

OPTICAL ASSEMBLY, IN PARTICULAR FOR POLARIZATION OF A LASER BEAM, AND EUV RADIATION GENERATING DEVICE THEREWITH

CROSS-REFERENCE TO PRIOR APPLICATIONS

This application is a continuation of International Patent Application No. PCT/EP2018/074547, filed on Sep. 12, 2018, the entire disclosure of which is hereby incorporated by reference herein.

FIELD

The present invention relates to an optical assembly, in particular for polarizing a laser beam. The present invention also relates to an EUV radiation generating apparatus having at least one such optical assembly.

BACKGROUND

A plate-shaped transmitting optical element can be used to polarize light, for example in the form of a (e.g. unpolarized) laser beam, if the laser beam is incident on a beam entry surface of the optical element at what is known as Brewster's angle. In this case, a radiation component that is reflected at the beam entry surface is polarized almost exclusively perpendicularly to the plane of incidence of the laser beam on the beam entry surface (s-polarization), i.e. the reflectivity for a second radiation component that is perpendicular thereto (p-polarized) is almost zero. A radiation component transmitted by the beam entry surface therefore typically has a large p-polarized radiation component parallel to the plane of incidence of the incident laser beam.

An optical assembly for polarizing a laser beam can have a plurality of transmitting optical elements in the form of plane-parallel plates, which are parallel to one another and are each aligned with their beam entry surfaces at the Brewster's angle with respect to the incident laser beam in order to further reduce the comparatively small s-polarized radiation component that is transmitted by a respective plane-parallel plate, so that the laser beam exiting the polarizer arrangement is almost exclusively p-polarized.

However, in particular in the event that the plane-parallel plates are arranged at a comparatively small distance from one another, the problem of constructive and destructive interference occurs between partial beams that are reflected at the beam entry surfaces or at the beam exit surfaces of the plane-parallel plates. In order to avoid interference effects, the distance between two plates following one another in the beam path is therefore typically chosen to be so large that the reflected partial beams do not overlap. In this case, however, the polarizer arrangement may require considerable installation space.

In order to avoid the interference effects described above, it is proposed in PCT/EP2017/067480 to align the beam entry surfaces and the beam exit surfaces of the plate-shaped optical elements in each case at at least one wedge angle with respect to one another. In this way, the plate-shaped optical elements can be arranged at the smallest possible distances from one another. In order to meet the Brewster's condition despite the wedge shape of the plate-shaped optical elements, the plate-shaped optical elements are aligned with respect to one another (typically rotated relative to one another) in such a way that the laser beam continues to be incident on the beam entry surfaces at the Brewster's angle. To accommodate the plate-shaped optical elements in a predetermined alignment and position relative to one another, a holder is provided that can engage, for example, the lateral peripheries of the plate-shaped optical elements in order to fix the plate-shaped optical elements in the holder.

SUMMARY

In an embodiment, the present invention provides an optical assembly that is for polarizing a laser beam. The optical assembly has a plurality of plate-shaped optical elements having a beam entry surface and a beam exit surface, and a holder configured to joint fix the plate-shaped optical elements. At least three spacers are arranged between each two adjacent ones of the plate-shaped optical elements. Each of the spacers is configured to provide punctiform contact with the respective beam exit surface of a first plate-shaped optical element, of the plate-shaped optical elements, and to provide punctiform contact with the respective beam entry surface of a second adjacent plate-shaped optical element, of the plate-shaped optical elements.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide an optical assembly configured in such a way that the plate-shaped optical elements can be positioned relative to one another with high precision, and provide an EUV (extreme ultra violet) radiation generating apparatus having such an optical assembly.

According to a first aspect, this object is achieved by an optical assembly of the type mentioned in the introductory part, in which at least three spacers, in particular at least four spacers, are arranged between each two adjacent plate-shaped optical elements, which spacers are configured in each case for punctiform contact with a beam exit surface of a first plate-shaped optical element and for punctiform contact with a beam entry surface of a second, adjacent plate-shaped optical element.

The spacers are at least partially introduced into a gap between two adjacent plate-shaped optical elements to realize the punctiform contact. The exact angular position of the plate-shaped optical elements relative to one another (angular accuracy approx. ±0.02°) is realized with the aid of an arrangement of at least three spacers in punctiform contact with the respective beam entry or beam exit surfaces, which are arranged in at least three different positions within the gap. Depending on the dimensions or the geometry of the plate-shaped optical elements, it can be advantageous if four or possibly more spacers are used rather than three spacers in order to increase the mechanical stability and minimize the risk of tilting. For example, four or possibly more spacers can be useful for spacing out rectangular plate-shaped optical elements whose longitudinal sides are twice or three times as long as their transverse sides.

The plate-shaped optical elements can be stacked on top of one another in a stacking direction and can be aligned with respect to one another in their relative angular positions by means of the spacers, which are introduced into the gaps between the plate-shaped optical elements. In the simplest case, the optical assembly has two plate-shaped optical elements that are stacked on top of one another, but generally more than two, for example three, four, five, six, . . . plate-shaped optical elements are stacked on top of one another in order to polarize the laser beam. The optical assembly described here does not necessarily have to be used for the polarization of a laser beam; rather it can serve as an etalon, for example, since a skewed or tilted alignment of the plate-shaped optical elements can also be useful in the case of etalons. When used as an etalon, the optical assembly generally has two plate-shaped optical elements, which are separated by a gap that can be wedge-shaped, for example. Owing to the wedge shape or the non-parallel alignment of the plate-shaped optical elements, the use of spacer plates or the like is problematic in this case, too.

In contrast to the use of spacers described above, plate-shaped optical elements are conventionally held individually, that is to say for each individual plate-shaped optical element, a holder or mount is made that has a precisely machined support surface and spring clips or spring-preloaded clamping plates to hold the plate-shaped optical element. Such holding of a plurality of plate-shaped optical elements by means of spring-clamp for each one requires a high degree of accuracy when aligning the surfaces with one another and also considerable installation space for the individual clamps, which can be significantly reduced by the punctiform contact of the spacers.

In one embodiment, the spacers have a spherical surface for punctiform contact with the respective beam entry surface and with the respective beam exit surface. The spherical surface can be formed on a ball, which is loosely held in the holder, for example in a ball cage. Such loose balls can be produced with high precision. The spherical surface or the ball does not have to form a complete sphere; rather the ball can be cut off laterally and/or attached to a shaft. In a preferred embodiment, the spherical surface rests against the respective plate-shaped optical elements in order to realize the punctiform contact. The angular position of the plate-shaped optical elements relative to one another depends in each case on the spherical diameter of the spherical surface, which can be set precisely when the spacers are produced. By using the spherical surface, a smaller distance between the plate-shaped optical elements can also be achieved than is the case with the clamping described further above.

In a development, the spherical surfaces of at least two spacers that are arranged between the first and the second plate-shaped optical element, have different spherical diameters. The plate-shaped optical elements are generally tilted relative to one another, i.e. they are not aligned parallel to one another, with the result that a wedge-shaped gap is formed between two adjacent plate-shaped optical elements. The plate-shaped optical elements can in particular be tilted relative to one another in two spatial planes, that is to say they can be aligned with one another skewed in practically any direction. In order to suitably align the plate-shaped optical elements that are tilted relative to one another, spacers are typically used with different spherical diameters.

In a development, the spacers each have a ball head on which the spherical surface is formed, wherein a shaft for holding the respective spacer in the holder is connected to the ball head. Due to the tilted alignment of the plate-shaped optical elements relative to one another, the spherical surfaces should be positioned as precisely as possible in a plane perpendicular to the stacking direction, since a lateral offset of the punctiform contact changes the angle between the plate-shaped optical elements. Precise positioning of the spacers is possible through the use of ball pins or ball studs, which have a ball head and a shaft that can be held in the holder, for example in a hole or the like, with sufficient precision. In contrast, when using balls that are held in a ball cage, there is the problem that they could fall out of the ball cage.

In a development, the shaft has a shoulder and, in the case of at least two spacers whose spherical surfaces have different spherical diameters, a diameter of a first shaft section between the ball head and the shoulder and a length of a second shaft section between the shoulder and a shaft end of the spacer are of different sizes. In order to correctly set the angle between the plate-shaped optical elements, a spacer with a suitable spherical diameter is attached at the correct position in the gap or to a corresponding hole in the holder. This can be achieved by providing a shoulder on the shaft of a respective spacer, which is inserted into a stepped hole or into a hole in the holder having a corresponding shoulder. By realizing different diameters of the first shaft sections between the shoulder and the ball head and realizing different lengths of the second shaft sections between the shoulder and the shaft end, it can be ensured that all spacers are attached at the right place in the holder (key-lock principle).

A first spacer, in which the first shaft section has a smaller diameter than another (second) spacer, here typically has a second shaft section with a greater length between the shoulder and the shaft end than the second spacer. Such a first spacer having a thinner first shaft section can typically not be attached to a hole in the holder provided for the second spacer due to the greater length of the second shaft section because the shaft end protrudes beyond the hole. A second spacer cannot be inserted into a hole provided for the first spacer due to the larger diameter of the first shaft section.

In a further embodiment, the spacers are held in the holder perpendicularly to a beam entry surface of the first plate-shaped optical element such that they are tiltable and/or displaceable. The spacers should have a degree of freedom of movement in a direction perpendicular to the beam entry surface of the first (for example the topmost) plate-shaped optical element of the stacked plurality of optical elements in the beam path in order to be able to compensate for the thickness tolerance of the plate-shaped optical elements. In order to achieve this, the spacers, more precisely the shafts thereof, can be held displaceably over a comparatively short length along the direction perpendicular to the beam entry surface. Since the displaceable holding entails a risk of jamming, it is generally better if the spacers are held such that they are tiltable. The spacers can additionally be resiliently mounted in both cases.

In a development, a respective shaft of a spacer has a convexly curved shaft end and the holder comprises at least one spring element for pressing the shaft end against a contact surface of the holder. In this way, tiltable holding of the spacer can be realized, in which the shaft can be slightly deflected or tilted from a rest position in which it is aligned parallel to the hole, if a force that is aligned parallel to the stacking direction or is aligned perpendicular to the first beam entry surface acts on the ball head. The spring element can, for example, be a slitted leaf spring, the two free ends of which engage in two parallel grooves on the shaft, for example on the second shaft section. For this purpose, the shaft or the shaft end of the spacer can protrude into a slot in which the leaf spring runs or is guided. In addition to pressing the shaft end against the contact surface, the leaf spring can generate a restoring force on the resiliently mounted shaft of the spacer in the direction of the basic position, which is aligned parallel to the hole.

In one embodiment, two adjacent plate-shaped optical elements each have a minimum distance of less than 3 mm from one another. The minimum distance between the plate-shaped optical elements is understood to mean the minimum distance between any two points of two oppositely located beam entry surfaces and beam exit surfaces. As described further above, the distance between the plate-shaped optical elements can be selected to be very small due to the punctiform contact. The minimum distance between the plate-shaped optical elements is determined by the (minimum) diameter of the spherical surfaces used as spacers: The minimum distance between two adjacent plate-shaped optical elements is here usually only slightly smaller than the smallest spherical diameter of the respective spacers.

In a further embodiment, the (planar) beam entry surfaces and the (planar) beam exit surfaces of the plate-shaped optical elements are each aligned at at least one wedge angle with respect to one another. As described further above, when using the optical assembly for polarizing a laser beam in order to avoid interference effects, it is expedient if the beam entry surface and the beam exit surface of a respective plate-shaped optical element are not aligned parallel to one another. At least one plate-shaped optical element can have not just one, but two wedge angles, which extend in two planes typically perpendicular to one another. In order to meet the Brewster's condition for the laser beam that is incident on the respective beam entry surface of a plate-shaped optical element despite the wedge angle, the plate-shaped optical elements are aligned with one another (typically rotated relative to one another) in such a way that the laser beam for each plate-shaped optical element is incident on the beam entry surfaces at the Brewster's angle.

In a further embodiment, the beam entry surfaces and the beam exit surfaces in at least two, in particular in all, plate-shaped optical elements are not aligned parallel to one another. The beam entry surfaces and the beam exit surfaces of the plate-shaped optical elements can in principle be oriented as desired (skewed) to one another in space, i.e. the plate-shaped optical elements can be arranged tilted with respect to one another not only in one, but in two spatial planes, provided that it is ensured that the beam entry surfaces are each aligned at the Brewster's angle with respect to the laser beam. A respective gap between two plate-shaped optical elements therefore typically has a location-dependently varying gap width or a wedge shape. A skewed alignment of the plate-shaped optical elements can also be advantageous to minimize interference effects.

In a further embodiment, the holder has a plurality of bars for pressing a respective side surface of a plate-shaped optical element against a base body of the holder. The held plate-shaped optical elements that rest against the spacers and are suitably aligned can be pressed against the base body of the holder at a respective side surface, for example at a respective longitudinal side, by means of a possibly spring-mounted bar in order to fix the respective plate-shaped optical element. The plate-shaped optical elements can for example have a thickness in the order of approx. 5-10 mm and a longitudinal side in the order of approx. 150-170 mm. The transverse side of the plate-shaped optical elements can, for example, have a length in the order of approx. 50 mm. Owing to the plate-shaped optical elements pressing against the base body, the cooling thereof can be simplified, as will be described below. For this purpose, it is not necessary for the bars to extend along the entire length of the longitudinal side of a respective plate-shaped optical element.

In a further embodiment, the holder has an in particular monolithic base body with at least one cooling channel for a cooling fluid to flow through. A cooling fluid, for example water, can flow through the cooling channel in order to cool the plate-shaped optical elements which for this purpose rest against the base body—usually in the vicinity of the cooling channel.

In a further embodiment, the optical assembly comprises at least one preferably spring-mounted pressing element for pressing the plurality of plate-shaped optical elements that are spaced apart by means of the spacers against a pressure surface of the holder. The plurality of the plate-shaped optical elements, which are aligned relative to one another by the spacers introduced into the gaps between adjacent plate-shaped optical elements and stacked on top of one another, are pressed jointly, i.e. as a package, against the pressure surface with the aid of the at least one bar and are clamped in the process. Due to the degree of freedom of movement described further above of the spacers, the plate-shaped optical elements are only finally defined in their relative position and alignment with respect to one another after they have been clamped. In the clamped position, all spacers rest at a predetermined position and with a punctiform contact against the respective beam entry surfaces or beam exit surfaces.

In a further embodiment, the plate-shaped optical elements are adhesively bonded to the holder. The adhesive bond enables better heat transfer between the holder, or the base body of the holder, and the plate-shaped optical elements and also improved transport protection, if better heat transfer or improved transport protection is required. For adhesively bonding the plate-shaped optical elements, holes through which the adhesive can be applied can be provided in the holder. The holes for the adhesive can, for example, pass through the bars, which press a respective side surface of the plate-shaped optical elements against the contact surface of the holder. Corresponding holes for the application of the adhesive can also be formed along the contact surface of the holder.

In a further embodiment, the spacers are arranged in the holder between different plate-shaped optical elements with a lateral offset with respect to one another, i.e. the spacers are laterally offset with respect to a direction perpendicular to the beam entry surface of the first plate-shaped optical element in the beam path. Correspondingly, the plate-shaped optical elements cannot be arranged directly one above the other, but rather are attached or fixed in the holder with a lateral offset.

In particular, in the event that the plate-shaped optical elements are tilted with respect to one another in two spatial planes, an individual spherical diameter is required for each spacer in the extreme case, i.e. a different type of spacer. In order to minimize the number of different types of spacers as much as possible, it can be expedient to laterally offset the positions of the spacers in a plane parallel to the beam entry surface of the first plate-shaped optical element and/or the plate-shaped optical elements themselves. For example, in the case of an optical assembly that has six plate-shaped optical elements and correspondingly five gaps between the plate-shaped optical elements, in each case with four spacers, a total of twenty spacers are required. With a suitable (individual) choice of a respective distance between two adjacent plate-shaped optical elements and with a suitable choice of the positions of the spacers along the beam entry or exit surfaces, it is possible to reduce the number of the different types of spacers overall to six.

A further aspect of the invention relates to an EUV radiation generating apparatus, comprising: a driver laser device for generating a laser beam, a vacuum chamber in which a target material may be arranged, a beam guidance device for guiding the laser beam from the driver laser device to the target material, and an optical assembly, as described further above, which serves for the (linear) polarization of the laser beam and/or as an optical isolator. The beam guidance device guides the laser beam to a focusing element or to a focusing arrangement, which serves to focus the laser beam in a target region. In the target region, a target material (for example tin) is provided which, when irradiated with the laser beam, transitions into a plasma state and emits EUV radiation in the process. In the case of the optical assembly used to polarize the laser beam, the beam entry surface of a respective plate-shaped optical element is aligned at the Brewster's angle with respect to the incident laser beam. For the purposes of this application, incidence "at the Brewster's angle" $\alpha_B$ is understood to mean an incidence of the laser beam with a deviation from the Brewster's angle $\alpha_B$ of the order of magnitude of approx. +/−0.5°, i.e. angles $\alpha_B$+/−0.5° also fall under the term "at the Brewster's angle."

In one embodiment, the EUV radiation generating apparatus has a phase shifting device, which is arranged between the optical assembly and the target material, wherein the phase shifting device is configured to form a laser beam that is reflected at the target material and the polarization direction of which is aligned perpendicularly to the polarization direction of the laser beam propagating to the target material. In this case, the polarization direction of the laser beam is rotated through a total of 90° at the phase shifting device, with the result that the polarization direction of the laser beam that is again incident on the optical assembly and reflected back by the target material is aligned perpendicularly to the polarization direction of the laser beam propagating to the target material.

The phase shifting device can be, for example, a phase shifting mirror, which produces a path difference of λ/4 when the laser beam passes through it in the forward direction and when the laser beam passes through it in the backward direction, resulting overall in a path difference of λ/2 and thus a rotation the polarization direction through 90°. By rotating the polarization direction, the laser beam reflected back is deflected by the optical assembly, more precisely reflected at the respective plate-shaped optical elements, with the result that it can no longer return to the beam source and the optical assembly therefore acts as an optical isolator.

Further advantages of the invention are apparent from the description and the drawing. The aforementioned features and the features mentioned further below can likewise be employed in each case by themselves or in any desired combination. The embodiments shown and described should not be understood to be an exhaustive list, but rather have an exemplary character for the purpose of illustrating the invention.

In the following description of the drawings, identical reference signs are used for the same components or for components having the same function.

Figure 1:
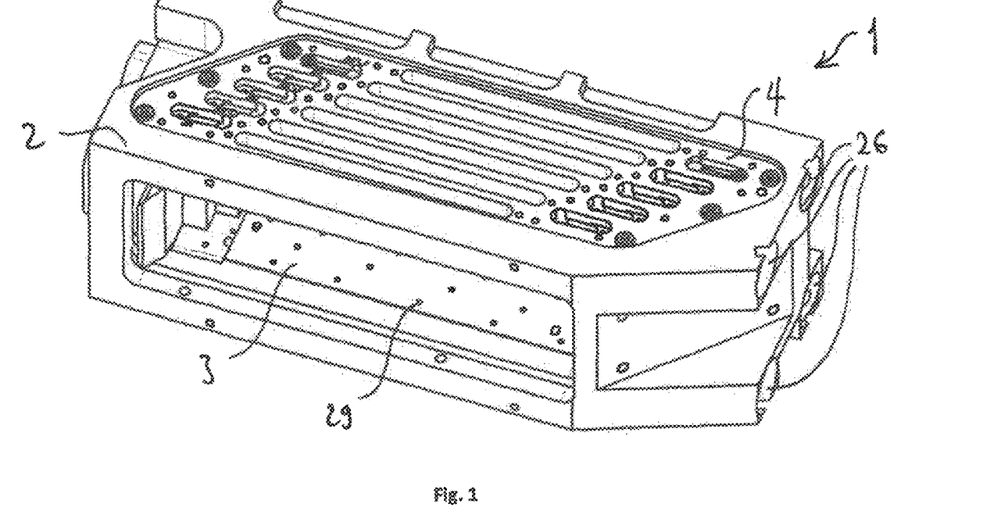
FIG. 1 shows a schematic illustration of a base body of a holder for six plate-shaped optical elements of an optical assembly.
Figure 2A:
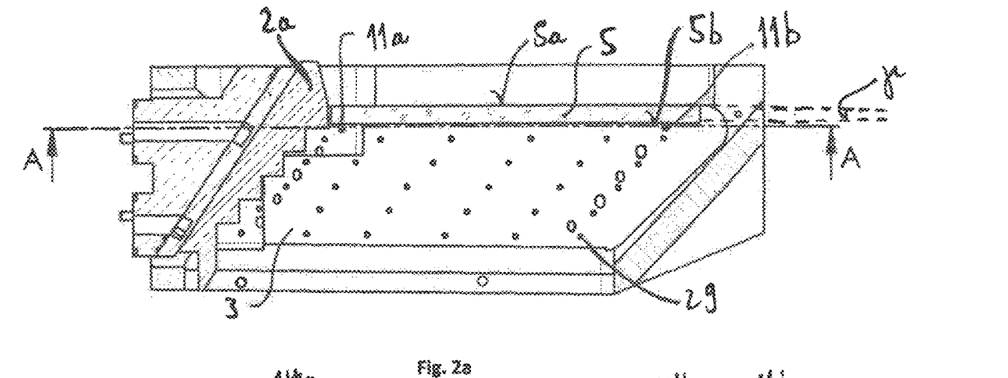
FIG. 2a shows a schematic sectional illustration of the base body from FIG. 1 with a plate-shaped optical element, which rests in a punctiform manner on or against the ball heads of four spacers.

FIG. 1 shows a holder 1 for a plurality of plate-shaped optical elements. The holder 1 has a substantially cuboid base body 2, which has a base plate 3 and a cover plate 4 on two mutually opposite side surfaces and which is configured in the manner of a frame. FIG. 2a shows a sectional illustration through the base body 2 with a first plate-shaped optical element 5, which has a planar beam entry surface 5a and a planar beam exit surface 5b. The beam exit surface 5b is aligned with respect to the beam entry surface 5a at a wedge angle γ, which is approx. 0.5°. A beam trap 2a, which serves to absorb radiation exiting from the end face of the first plate-shaped optical element 5, is loosely placed in the base body 2. To minimize the thermal influence on the base body 2, the beam trap 2a is not directly connected to the base body 2 and is cooled separately.

Figure 2B:
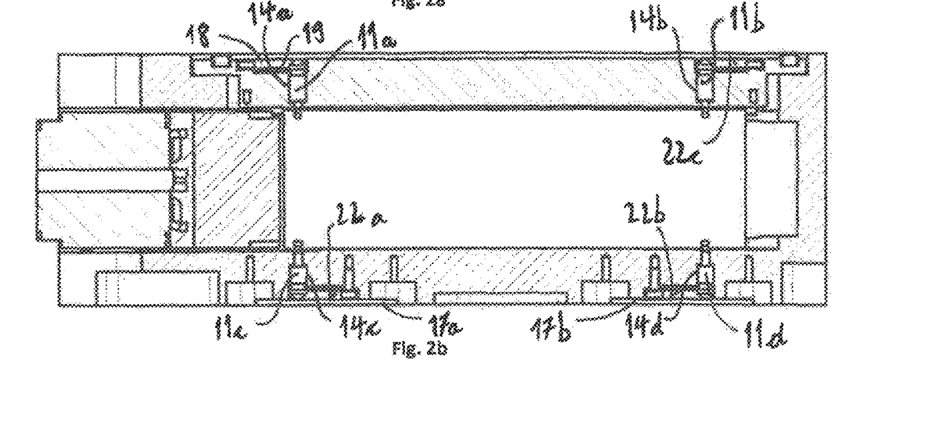
FIG. 2b shows a schematic sectional illustration along the section line A-A from FIG. 2a with the four spacers that are inserted into a respective hole.

After the beam trap 2a has been placed, the first plate-shaped optical element 5 shown in FIG. 2a is fitted in the holder 1. The first plate-shaped optical element 5 here rests with its beam exit surface 5b in a punctiform manner on four spacers 11a-d, which are shown in FIG. 2b. As can be seen in FIG. 2b and in particular in FIG. 3, the spacers 11a-d each have a ball head 12, which has a circumferential spherical surface 12a, which is used for punctiform contact with the beam exit surface 5b of the first plate-shaped optical element 5. The distance, or the width of a gap, between the first optical element 5 and an adjacent optical element varies depending on the location, which is why the four spacers 11a-d in the example shown have a ball head 12 with a respective different spherical diameter D1.

Figure 3:
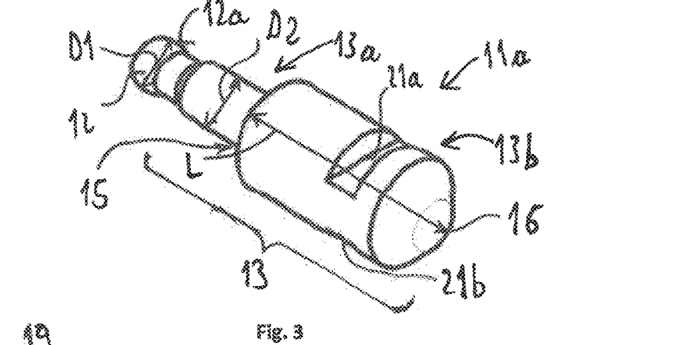
FIG. 3 shows a schematic illustration of a spacer in the form of a ball pin with a shaft, which has a shoulder.

For holding the respective spacer 11a-d on the holder 1, the spacers 11a-d each have a shaft 13, which is inserted into a hole 14a-d provided in the holder 1. The shaft 13 has a shoulder 15, which is formed between a first shaft section 13a and a second shaft section 13b. The first shaft section 13a is formed between the ball head 12 and the shoulder 15, and the second shaft section 13b is formed between the shoulder 15 and a shaft end 16 of the spacer 11a. A step or a respective shoulder is also formed in the associated holes 14a-d for receiving a respective shaft 13.

In order to avoid mounting of a spacer 11a-d that is not intended for a respective hole 14a-d because it has an incorrect spherical diameter D1 in the holder 1, the different spacers 11a-d and the associated holes 14a-d work according to the key-lock principle: Spacers 11a-d that have different spherical diameters D1 differ both in terms of the diameter D2 of the first shaft section 13a and in terms of the length L of the second shaft section 13b such that spacers 11a-d having a larger diameter D2 of the first shaft section 13a have a smaller length L of the second shaft section 13b, and vice versa. Spacers 11a-d, which have a diameter D2 of the first shaft section 13a that is too large for a respective hole 14a-d, cannot be inserted into a wrong hole 14a-d. The spacers 11a-d whose first shaft section 13a has a smaller diameter D2 than the diameter of the corresponding hole 14a-d, but which are nevertheless not intended for this hole 14a-d, have a length L of the second shaft section 13b that is selected such that the shaft end 16 protrudes outwardly beyond the hole 14a-d.

Such a protruding shaft 13 of a first or second spacer 11a,b cannot be covered by means of a respective closure plate 17a,b screwed onto the cover plate 24 (cf. FIG. 2b). Accordingly, a respective spacer 11c,d cannot be covered by two closure plates screwed onto the base plate 3 on the opposite side. In this way it is ensured that only one spacer 11a-d having a single, suitable design is received in an associated hole 14a-d.

In order to compensate for a thickness tolerance of the first plate-shaped optical element 5, the spacers 11a-d have a degree of freedom of movement in a direction parallel to the beam entry surface 5a of the first plate-shaped optical element 5. In the example shown, the degree of freedom of movement is realized in that the spacers 11a-d are tiltably held in the holder 1 perpendicular to the beam entry surface 5a of the first plate-shaped optical element 5. For the tiltable holding, the shaft end 13 of a respective spacer 11a-d is convexly curved, as can be seen in particular in FIG. 3. As can be seen in FIG. 2b and in FIG. 4, the shaft end 16 of the shaft 13 of a respective spacer 11a-d protrudes into a slot 18, in which a leaf spring 19 is guided.

Figure 4:
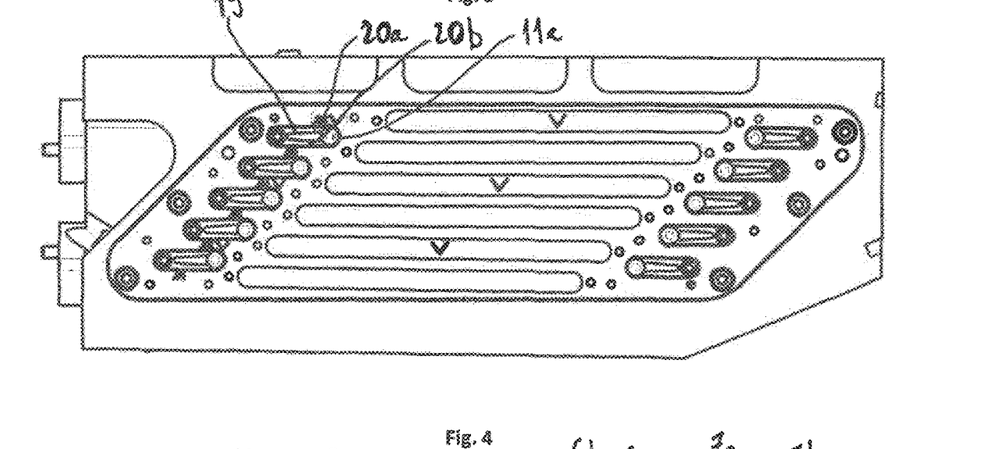
FIG. 4 shows a schematic top view of a cover plate of the base body, in which slots have been made, which are provided with leaf springs.

The leaf spring 19 is attached to the end of the slot 19 facing away from the spacer 11a-d by means of a screw and has two free ends 20a,b separated by a slit, which engage in two parallel grooves 21a,b on the shaft 13, more precisely on the second shaft section 13b. The leaf spring 19 presses the shaft end 16 of a respective spacer 11a-d against a contact surface 22a-c, which is formed on the inside of the first, the second, and the third closure plate 17a-c. The leaf spring 19 generates a restoring force acting on the shaft 13 when the latter is tilted from a basic position aligned parallel to the respective hole 14a-d perpendicular to the beam entry surface 5a of the first plate-shaped optical element 5.

Figure 5:
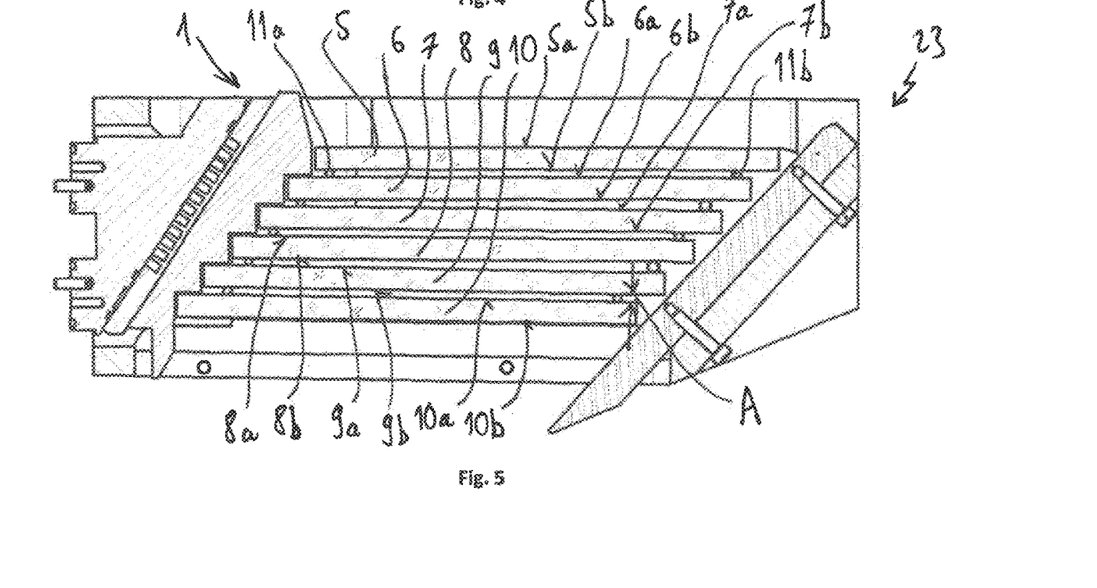
FIG. 5 shows a schematic sectional illustration of an optical assembly, in which six plate-shaped optical elements separated from one another by spacers are arranged in the holder.

FIG. 5 shows a sectional illustration of an optical assembly 23, which has the holder 1 described further above and six plate-shaped optical elements 5, 6, 7, 8, 9, 10. As shown above in connection with FIG. 2a, two adjacent plate-shaped optical elements 5-10 are each spaced apart by four spacers 11a-d, which are in punctiform contact with a respective beam exit surface 5b, 6b, 7b, 8b, 9b and with an adjacent beam entry surface 6a, 7a, 8a, 9a, 10a. In the example shown in FIG. 5, two adjacent plate-shaped optical elements 5-10 each have a minimum distance A of less than 3 mm, possibly less than 1 mm, from one another, which corresponds to a minimum gap width between the plate-shaped optical elements 5-10.

The plate-shaped optical elements 5-10 are tilted with respect to one another in two planes, that is to say their beam entry surfaces 5a-10a and their beam exit surfaces 5b-10b are not aligned parallel to one another. For this reason, as described further above, a plurality of types of spacers 11a-d with different spherical diameters D1 are required in order to align the plate-shaped optical elements 5-10 at a suitable angle with respect to one another. As can also be seen in FIG. 5, the plate-shaped optical elements 5-10 are arranged parallel to the beam entry surface 5a of the first plate-shaped optical element 5 with a lateral offset. The number of spherical diameters D1 and thus the number of different types of spacers 11a-d needed for the angular alignment can be reduced by the lateral offset or by the stepped arrangement and also by a suitable choice of the distance A between the plate-shaped optical elements 5-10.

Figure 6:
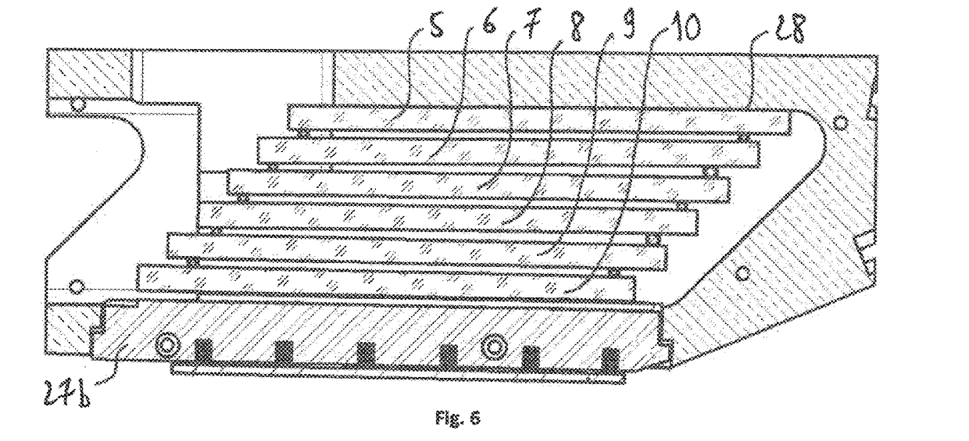
FIG. 6 shows a schematic sectional illustration analogous to FIG. 5 with a spring-mounted bar for pressing the stacked plate-shaped optical elements against a pressure surface of the holder.
Figure 7:
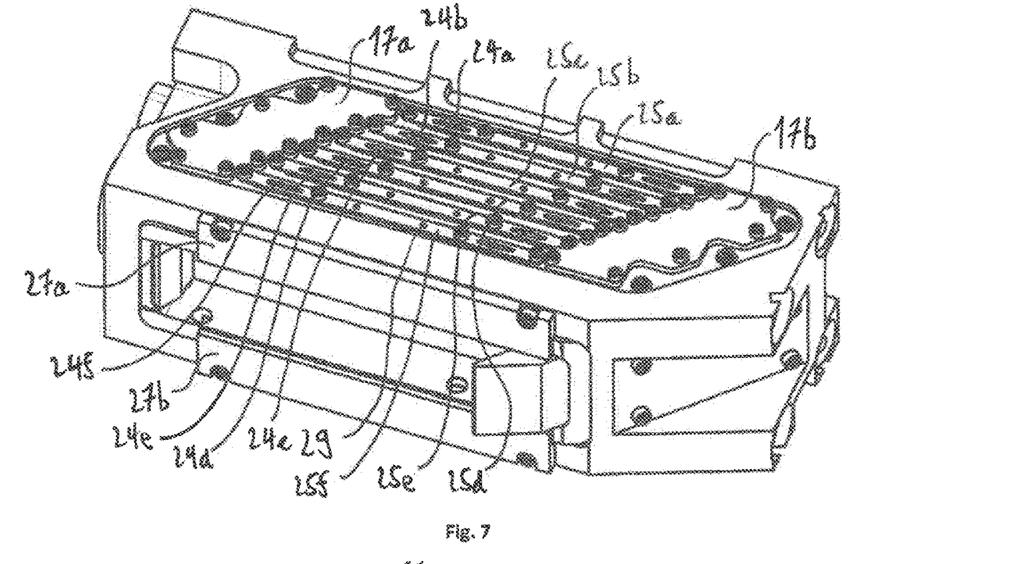
FIG. 7 shows a perspective illustration of the optical assembly from FIG. 6.

FIG. 6 and FIG. 7 show the optical assembly 23, in which the six plate-shaped optical elements 5-10 are pressed on their respective longitudinal sides against the base body 2 of the holder 1 with the aid of six bars 24a-f. The bars 24a-f are inserted into the holder 1 through longitudinal slits in the cover plate 4 shown in FIG. 1 and are connected to or screwed to the base body 2 with the aid of rail-shaped leaf springs 25a-f which likewise extend in the longitudinal direction. For the resilient holding of the bars 24a-f, they are attached in a central section of the rail-shaped leaf springs 25a-f, more precisely screwed to the latter. The central section of the rail-shaped leaf springs 25a-f, to which the bars 24a-f are attached, is resiliently connected to the outer ends of the rail-shaped leaf springs 25a-f via tongue-shaped rail sections separated from one another by a slit. Pressing the plate-shaped optical elements 5-10 against the base body 2 is expedient in order to improve the heat transfer between the plate-shaped optical elements 5-10 and the base body 2. Cooling channels 26 are provided in the base body 2 so that a cooling fluid, specifically cooling water, may flow through. Four such cooling channels 26 are shown by way of example in FIG. 1.

As has been described further above, the spacers 11a-d are movably or tiltably mounted in a direction perpendicular to the beam entry surface 5a of the first plate-shaped optical element 5. In order to fix the six plate-shaped optical elements 5-10 as a whole, i.e. as a stack, in the holder 1, the holder has two spring-mounted pressing elements 27a,b, which in the example shown are configured as bars that extend in the longitudinal direction along the beam exit surface 10b of the sixth plate-shaped optical element 10. As can be seen in FIG. 7, the two pressing elements 27a,b form two legs of a frame, between which a free space is formed for the laser beam to pass through. As shown in FIG. 6, the pressing elements 27a,b press flat against the beam exit surface 10b of the sixth plate-shaped optical element 10, and in this way all six plate-shaped optical elements 5-10, which are spaced apart from one another by means of the spacers 11a-d, press against a planar, frame-shaped pressure surface 28 of the holder 1. The pressing elements 27a,b in the form of the bars are spring-mounted on the base body 2 in order to avoid damage to the plate-shaped optical elements 5-10 during fixing or clamping.

The plate-shaped optical elements 5-10 fixed in the holder 1 in the manner described above can additionally be adhesively bonded in the holder 1 in order to secure them for transport and/or to improve heat transfer between the plate-shaped optical elements 5-10 and the holder 1. For the application of an adhesive, drill channels 29 are provided in the holder 1, for example in the base plate 3 (cf. FIG. 1 or FIG. 2a) and in the bars 24a-f or in the rail-shaped leaf springs 25a-f. The adhesive can reach the longitudinal sides of the plate-shaped, rectangular optical elements 5-10 through the drill channels 29 in order to fix said elements in the holder 1 in a materially bonded manner.

The optical assembly 23 shown further above can serve to polarize a laser beam 30 (cf. FIG. 8), which is aligned such that it is incident on the beam entry surface 5a of the first plate-shaped optical element 5 at the Brewster's angle. The beam entry surfaces 6a-10a of the plate-shaped optical elements 6-10 that follow in the beam path of the laser beam 30 are aligned in such a way that they are also aligned at the Brewster's angle with respect to the laser beam 30. To achieve this, the optical elements 5-10 are each rotated by at least one angle of rotation with respect to one another, which is selected such that it corresponds to the absolute value of a deflection angle when the laser beam 30 passes through a respective optical element 5-10. When the laser beam 30 is incident on the respective beam entry surface 5a-10a at the Brewster's angle, substantially only a p-polarized radiation component is transmitted, i.e. a radiation component whose polarization direction runs parallel to the plane of incidence of the incident laser beam 30.

Instead of an unpolarized laser beam, a p-polarized laser beam 30 can also be radiated into the optical assembly 23, and said laser beam 30 leaves the latter substantially without attenuation. The optical assembly 23 serves in this case as an optical isolator (or as an optical diode) to prevent the passage of a back-reflected laser beam 30a, the direction of polarization of which is rotated through 90° with respect to the incident laser beam (i.e. an s-polarized laser beam 30a), through the optical assembly 23. The use of the optical assembly 23 as an optical isolator in connection with an EUV radiation generating apparatus 31 shown in a highly schematic manner in FIG. 8 is described below.

The EUV radiation generating device 31 comprises a beam source 33, an amplifier arrangement 34 having, for example, four or five optical amplifiers or amplifier stages 35a, 35b, 35c, a beam guidance device 36, and a focusing device 37. The focusing device 37 is used to focus the laser beam 30, which is generated by the beam source 33 and amplified by the amplifier arrangement 34, at a target region in a vacuum chamber 38, in which a target material 39 is introduced. Upon irradiation with the laser beam 30, the target material 39 transitions into a plasma state and emits EUV radiation in the process, which is focused by means of a collector mirror 40. In the example shown in FIG. 8, the collector mirror 40 has an opening for the passage of the laser beam 30. In the example shown, the beam source 33 has two $CO_2$ lasers in order to generate a pre-pulse and a main pulse, which are amplified together in the amplifier arrangement 34 and are focused at the target material 29. The beam source 33 forms, together with the amplifier arrangement 34, a driver laser arrangement 41 of the EUV radiation generating apparatus 31.

Figure 8:
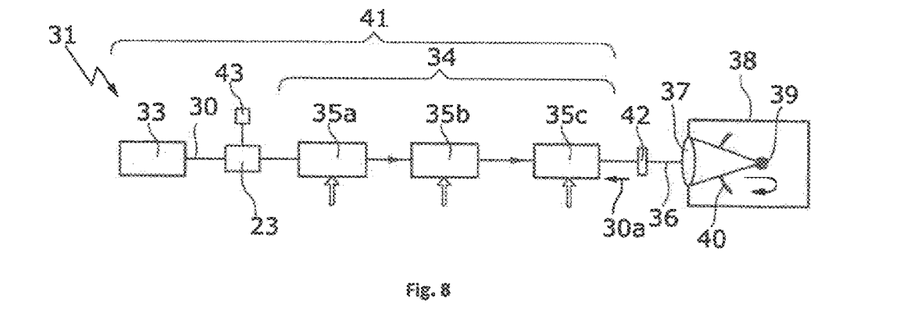
FIG. 8 shows an EUV radiation generating apparatus having an optical assembly according to FIG. 7, which is used as an optical isolator.

In the example shown in FIG. 8, the optical assembly 23 is arranged between the beam source 33 and the amplifier arrangement 34 and serves to transmit the pulsed laser beam 30, which has been generated by the beam source 33 and is typically already linearly polarized, from the driver laser arrangement 41 to the target material 39 with as little loss as possible and to filter or deflect the laser beam 30a, which is reflected back at the target material 39 and propagates in the opposite direction, such that it can no longer reach the beam source 33 or optical elements in the beam path upstream of the optical assembly 23.

In order to filter or deflect the laser beam 30a, which is reflected back at the target material 39 and is incident again on the optical assembly 23, its polarization direction is rotated through 90° with respect to the laser beam 30 exiting the optical assembly 23 in the forward direction. To rotate the polarization direction of the laser beam 30 through 90°, a phase shifting device 42 is arranged between the optical assembly 23 and the target material 39. The phase shifting device 42 can be, for example, a phase shifting mirror which, when the laser beam 30 propagating in the direction of the target material 39 and the back-reflected laser beam 30a propagating in the opposite direction pass through it, produces a total path difference of $\lambda/2$ and thus causes the desired rotation of the polarization direction through 90°. It is to be understood that other phase-shifting or polarization-rotating optical elements arranged between the optical assembly 23 and the target material 39 can also be used for this purpose.

The s-polarized back-reflected laser beam 30a is filtered in the optical assembly 23 by reflection at the respective beam exit surfaces 5b, 6b, . . . for the incident laser beam 30, which form beam entry surfaces for the back-reflected laser beam 30a. The s-polarized radiation component reflected at the respective beam exit surface 5b, 6b, . . . can be deflected to a beam trap 43. As shown in FIG. 8, the beam trap 43 can be arranged outside the holder 1, in which the plate-shaped optical elements 5-10 are received and fixed in their positions relative to one another. Alternatively, the beam trap 43 can be integrated into the holder 1 or into a corresponding housing of the polarizer arrangement 1, provided that adequate cooling is ensured.

It is to be understood that the optical assembly 23 or possibly a further optical assembly 23 can also be arranged at a different location in the EUV radiation generating apparatus 31, for example in the beam guidance device 36, in order to generate a linearly polarized laser beam 20 or to form an optical isolator.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical assembly for polarizing a laser beam, the optical assembly comprising:
   a plurality of plate-shaped optical elements having a beam entry surface and a beam exit surface, and a holder configured to joint fix the plate-shaped optical elements, wherein at least three spacers are arranged between each two adjacent ones of the plate-shaped optical elements, wherein each of the spacers is configured to provide direct and punctiform contact with the respective beam exit surface of a first plate-shaped optical element, of the plate-shaped optical elements, and to provide direct and punctiform contact with the respective beam entry surface of a second adjacent plate-shaped optical element, of the plate-shaped optical elements, wherein the spacers are held in the holder such that are tiltable, displaceable, or tiltable and displaceable, perpendicularly to a beam entry surface of the first plate-shaped optical element, and wherein a respective shaft of a spacer, of the spacers, which is configured to hold the spacer in the holder, has a convexly curved shaft end, and the holder comprises at least one spring element configured to press the shaft end against a contact surface of the holder.

2. The optical assembly as claimed in claim 1, wherein the spacers have a spherical surface configured to provide the direct and punctiform contact with the respective beam exit surface and with the respective beam entry surface.

3. The optical assembly as claimed in claim 2, wherein the respective spherical surface of at least two of the spacers arranged between the first plate-shaped optical element and the second plate-shaped optical element have different spherical diameters.

4. The optical assembly as claimed in claim 2,
wherein the spacers each have a ball head on which the spherical surface is formed, and
wherein the shaft configured to hold the respective spacer in the holder is connected to the ball head.

5. The optical assembly as claimed in claim 4,
wherein the shaft has a shoulder, and
wherein in the case of at least two of the spacers whose spherical surfaces have different spherical diameters, a diameter of a first shaft section between the ball head and the shoulder and a length of a second shaft section between the shoulder and a shaft end of the respective one of the spacers are of different sizes.

6. The optical assembly as claimed in claim 1, wherein two adjacent ones of the plate-shaped optical elements each have a minimum distance of less than 3 mm from one another.

7. The optical assembly as claimed in claim 1, wherein the respective beam entry surface and the respective beam exit surface of the plate-shaped optical elements are each aligned at at least one wedge angle with respect to one another.

8. The optical assembly as claimed in claim 1, wherein the respective beam entry surface and the respective beam exit surface in at least two of the plate-shaped optical elements are not aligned parallel to one another.

9. The optical assembly as claimed in claim 1, wherein the holder has a plurality of bars configured to press a respective side surface of a plate-shaped optical element, of the plate-shaped optical elements, against a base body of the holder.

10. The optical assembly as claimed in claim 1, wherein the holder has a base body with at least one cooling channel for a cooling fluid to flow through.

11. The optical assembly as claimed in claim 1, further comprising: at least one spring-mounted pressing element configured to press the plurality of plate-shaped optical elements that are spaced apart by the spacers against a pressure surface of the holder.

12. The optical assembly as claimed in claim 1, wherein the plate-shaped optical elements are adhesively bonded to the holder.

13. The optical assembly as claimed in claim 1, wherein the plate-shaped optical elements are arranged in the holder with a lateral offset with respect to one another.

14. An extreme ultraviolet (EUV) radiation generating apparatus, comprising:
a driver laser device configured to generate a laser beam,
a vacuum chamber in which a target material is arrangeable,
a beam guidance device configured to guide the laser beam from the driver laser device to the target material, and
the optical assembly as claimed in claim 1.

15. The EUV radiation generating apparatus as claimed in claim 14, further comprising: a phase shifting device arranged between the optical assembly and the target material, wherein the phase shifting device is configured to form the laser beam that is reflected at the target material and the polarization direction of which is aligned perpendicularly to the polarization direction of the laser beam propagating to the target material.

* * * * *